(12) United States Patent
Liang et al.

(10) Patent No.: US 9,998,298 B2
(45) Date of Patent: Jun. 12, 2018

(54) DATA TRANSMISSION METHOD, APPARATUS, AND COMPUTER STORAGE MEDIUM (71) Applicant: ZTE Corporation, Shenzhen, Guangdong (CN)

(72) Inventors: Qiongwen Liang, Shenzhen (CN); Lin Wang, Shenzhen (CN); Liquan Yuan, Shenzhen (CN); Weiliang Zhang, Shenzhen (CN); Junjian Zhang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 168 days.

(21) Appl. No.: 14/785,957

(22) PCT Filed: Apr. 16, 2014

(86) PCT No.: PCT/CN2014/075486
§ 371 (c)(1),
(2) Date: Oct. 21, 2015

(87) PCT Pub. No.: WO2014/173246
PCT Pub. Date: Oct. 30, 2014

(65) Prior Publication Data
US 2016/0072641 A1 Mar. 10, 2016

(30) Foreign Application Priority Data
Apr. 22, 2013 (CN) .......................... 2013 1 0141036

(51) Int. Cl.
H04L 12/46 (2006.01)
H04L 12/755 (2013.01)
(Continued)

(52) U.S. Cl.
CPC ........ *H04L 12/4633* (2013.01); *H04L 45/021* (2013.01); *H04L 61/6022* (2013.01); *H04L 67/108* (2013.01)

(58) Field of Classification Search
None
See application file for complete search history.

(56) References Cited

U.S. PATENT DOCUMENTS 8,320,386 B2 11/2012 Bao
2004/0114640 A1* 6/2004 Bhide ....................... H04J 3/12
370/395.51
(Continued)

FOREIGN PATENT DOCUMENTS

CN 1866923 A 11/2006
CN 101262386 A 9/2008
(Continued)

OTHER PUBLICATIONS

Anjing Wang et al: "Network Virtualization: Technologies, Perspectives, and Frontiers", Journal of Lightwave Technology, IEEE Service Center, New York, NY, US, vol. 31, No. 4, Feb. 1, 2013 (Feb. 1, 2013), pp. 523-537, XP011485693,ISSN: 0733-8724, D01:10.1109/JLT.2012.2213796.
(Continued)

Primary Examiner — Kodzovi Acolatse
(74) Attorney, Agent, or Firm — Oppedahl Patent Law Firm LLC (57) ABSTRACT Disclosed is a data transmission method. When it is determined that a transmitting end device and a receiving end device both support a link binding capability, a binding group is established; when data is selected to be transmitted by a binding link in the binding group, the data to be transmitted is encapsulated according to a binding data format and is transmitted through the binding link; and when data is selected to be transmitted by a non-binding link, the
(Continued)

data to be transmitted is encapsulated according to a common data format and is transmitted through the non-binding link. Also disclosed are a data transmission apparatus and a computer storage medium.

19 Claims, 5 Drawing Sheets

(51) Int. Cl.
*H04L 29/12* (2006.01)
*H04L 29/08* (2006.01)

(56) References Cited

U.S. PATENT DOCUMENTS

| | | | |
|---|---|---|---|
| 2008/0310442 | A1 | 12/2008 | Li |
| 2009/0154337 | A1* | 6/2009 | Kim ............... H04L 69/323 370/216 |
| 2009/0232152 | A1 | 9/2009 | Chen |
| 2009/0323520 | A1* | 12/2009 | Kapoor ............ H04L 41/0681 370/225 |
| 2010/0215042 | A1 | 8/2010 | Sato |
| 2011/0080842 | A1* | 4/2011 | Zheng ............. H04L 12/2863 370/252 |
| 2011/0085562 | A1 | 4/2011 | Bao |
| 2011/0188373 | A1* | 8/2011 | Saito ............... H04L 1/24 370/230 |
| 2011/0268115 | A1* | 11/2011 | Attarwala .......... H04L 45/02 370/390 |
| 2011/0292945 | A1 | 12/2011 | Yasuda |
| 2012/0188873 | A1* | 7/2012 | Nakatsugawa ...... H04L 1/0003 370/231 |
| 2012/0230184 | A1* | 9/2012 | Yong ............... H04L 45/245 370/225 |
| 2013/0242843 | A1* | 9/2013 | Kojima .............. H04W 4/06 370/312 |

FOREIGN PATENT DOCUMENTS

| | | |
|---|---|---|
| CN | 101656639 A | 2/2010 |
| CN | 102647353 A | 8/2012 |
| CN | 102685000 A | 9/2012 |
| EP | 1986385 A1 | 10/2008 |
| JP | 2006203471 A | 8/2006 |
| JP | 2007306167 A | 11/2007 |
| JP | 2008245031 A | 10/2008 |
| JP | 2010245943 A | 10/2010 |

OTHER PUBLICATIONS

Ethernet based multi-pair bonding.
The ppp Multilink protocol(MP).
ATM-based multi-pair bonding.
Unified functional architecture of transport networks.
Multi-pair bonding using time-division inverse multiplexing.
International Search Report in international application No. PCT/CN2014/075486, dated Jul. 16, 2014.
English Translation of the Written Opinion of the International Search Authority in international application No. PCT/CN2014/075486, dated Jul. 16, 2014.
Supplementary European Search Report in European application No. 14788798.8, dated Oct. 24, 2016.
Stefan Nowak et al: "Towards a convergent digital home network infrastructure", IEEE Transactions on Consumer Electronics, IEEE Service Center, New York, NY, US, vol. 57, No. 4,Nov. 1, 2011 (Nov. 1, 2011), pp. 1695-1703, XP011398448, ISSN: 0098-3063, DOI:10.1109/TCE.2011.6131143.
Anjing Wang et al: "Network Virtualization: Technologies, Perspectives, and Frontiers", Journal of Lightwave Technology, IEEE Service Center, New York, NY, US, vol. 31, No. 4,Feb. 1, 2013 (Feb. 1, 2013), pp. 523-537, XP011485693,ISSN: 0733-8724, DOI:10.1109/JLT.2012.2213796.
Nasu Yoichi, Understanding From The Basic Of LAN Building Skills ,8th,Link Bunching Broadband, The Methods Of Use Link Collection, Nikkei Information, Nikkei BP, Jul. 22, 2003, 243rd, p. 106-111.

* cited by examiner

| Destination MAC address | Source MAC address | Ethernet type field=0x893A | Message serial number | Fragment number | Fragment identifier | IP layer data packet | Frame check code |
|---|---|---|---|---|---|---|---|

DATA TRANSMISSION METHOD, APPARATUS, AND COMPUTER STORAGE MEDIUM

TECHNICAL FIELD

The present disclosure relates to communication technology, and in particular to a data transmission method, a data transmission apparatus and a computer storage medium.

BACKGROUND

The IEEE (Institute of Electrical and Electronic Engineers) 1905 standard provides multiple media of a home network with an abstraction layer that can abstract detailed specific operation information from each link in use and converge data transmitted/received through different links, thereby implementing seamless connection of various interconnection techniques in a home network. At present, functional entities of the abstraction layer can monitor in real time transmission quality of multiple links that can communicate between two devices, and can implement load balancing of data transmission in accordance with whether TCP (Transmission Control Protocol) or UDP (User Datagram Protocol) is used. For example, TCP data streams are transmitted through WiFi (Wireless Fidelity) links while UDP data streams are transmitted through PLC (Power Line Communication) links.

When data streams of various traffics are transmitted over a home network, transmission quality of data can be improved through transmission of the data based on whether a TCP or UDP data stream is transmitted and on selection of links over different media according to a bandwidth required by the data stream. However, when data streams of various traffics are transmitted concurrently, transmission resources provided by a single link may not meet data streams having higher bandwidth requirements, thereby resulting in an increase in packet loss rate and a decrease in transmission quality.

SUMMARY

In view of the above, embodiments of the disclosure are intended to provide a data transmission method, a data transmission apparatus and a computer storage medium that can provide appropriate bandwidth distribution for data streams of different traffic, thereby improving Quality of Service (QoS) of a network.

To this end, the technical solutions of embodiments of the disclosure are implemented as follows.

An embodiment of the disclosure provides a data transmission method including:

when it is determined that a transmitting end device and a receiving end device both support a link binding capability, a binding group is established;

when data is selected to be transmitted by a binding link in the binding group, the data to be transmitted is encapsulated according to a binding data format and is transmitted through the binding link; when the data is selected to be transmitted by a non-binding link, the data to be transmitted is encapsulated according to a common data format and is transmitted through the non-binding link.

In an embodiment, a state of the transmitting end device or the receiving end device comprises: an initial state, a binding setup completion state, a binding update completion state, a binding transmission starting state or a binding transmission completion state, and the transmitting end device or the receiving end device can switch between these states under a given condition.

In an embodiment, the step that it is determined that the transmitting end device and the receiving end device both support a link binding capability may include:

message interaction is performed between the transmitting end device and the receiving end device, wherein interactive messages carry information indicating whether the link binding capability is supported by each device.

In an embodiment, the interactive messages may include an added binding capability notification message and a binding capability notification response message, or a topology query message and a topology response message, or a link quality query message and a link quality response message, or a binding setup request message and a binding setup response message.

In an embodiment, the step that a binding group is established may include:

the transmitting end device transmits, to the receiving end device, a link binding setup request message that carries a binding group information table, wherein the binding group information table contains the binding link; and upon reception of the link binding setup request message transmitted by the transmitting end device, the receiving end device returns a link binding setup response message to the transmitting end device, wherein the link binding setup response message contains a link binding setup success identifier or a link binding setup failure identifier.

In the embodiment, the binding group information table contains at least one of:

a binding group identifier, a number of interconnected interface pairs within the binding group, a Media Access Control (MAC) interface address of each interface pair or an MAC interface type of each interface pair.

In an embodiment, the method may further include:

the transmitting end device transmits, to the receiving end device, a binding group update request message that carries a binding group information table required to be updated;

upon reception of the binding group update request message transmitted by the transmitting end device, the receiving end device returns a binding group update response message to the transmitting end device, wherein the binding group update response message contains a binding group update success identifier or a binding group update failure identifier.

In an embodiment, the method may further include:

after update of the binding group completes, when it is determined that the data to be transmitted needs to be transmitted using a binding link, the data to be transmitted is encapsulated according to the binding data format and is transmitted through a binding link in a updated binding group information table.

In an embodiment, the step that the data is selected to be transmitted by the binding link in the binding group may include:

when the data to be transmitted meets a given condition for transmission of data using a binding link, indicating that that the data is selected to be transmitted by the binding link in the binding group.

In an embodiment, the given condition for transmission of data using a binding link may include: a given Quality of Service (QoS) level of data, a Virtual Local Area Network (VLAN) number of a data packet being set to a given value or a priority identifier of a data packet being larger than a given threshold.

In an embodiment, the binding data format may include a message serial number, a fragment number and a fragment identifier.

In an embodiment, the method may further include:

the transmitting end device or the receiving end device transmits a binding capability closing message containing an identifier of a binding group required to be closed, and the transmitting end device and the receiving end device delete the binding group required to be closed.

An embodiment of the disclosure further provides a data transmission apparatus including a management module, a selection module, an encapsulation module and a transmission module, wherein the management module is configured to establish a binding group when it is determined that a transmitting end device and a receiving end device both support a link binding capability;

wherein the selection module is configured to determine whether data is used to be transmitted by a binding link or a non-binding link;

wherein the encapsulation module is configured to, when the data is selected to be transmitted by a binding link in the binding group, encapsulating the data to be transmitted according to a binding data format and transmitting the encapsulated data through the binding link; when the data is selected to be transmitted by a non-binding link, encapsulating the data to be transmitted according to a common data format and transmitting the encapsulated data through the non-binding link; and wherein the transmission module is configured to transmit, through the binding link, the data to be transmitted that is encapsulated by the encapsulation module.

In an embodiment, the apparatus may further include:

a device state machine configured to record the transmitting end device and the receiving end device in an initial state, a binding setup completion state, a binding update completion state, a binding transmission starting state or a binding transmission completion state, and enable the transmitting end device or the receiving end device to switch between these states under a given condition.

In an embodiment, the management module may include a binding group management sub-module, a binding protocol sub-module and a fragment sequencing sub-module, wherein the binding group management sub-module is configured to determine whether a binding group is established;

wherein the binding protocol sub-module is configured to construct a binding setup request message, a binding setup response message and a binding capability closing message, wherein the binding setup request message contains a binding group information table, and the binding setup response message contains a link binding setup success identifier or a link binding setup failure identifier; and wherein the fragment sequencing sub-module is configured to determine whether fragmentation is required for a data packet, and if yes, perform fragmentation on the data packet and sequence resulting fragments.

In an embodiment, the binding group management sub-module may be further configured to determine whether the binding group is required to be updated;

the binding protocol sub-module may be configured to construct a binding group update request message and a binding group update response message, wherein the binding group update request message contains an information table of a binding group required to be updated, and the binding group update response message contains a binding group update success identifier or a binding group update failure identifier.

In an embodiment, the encapsulation module may be further configured to, after update of the binding group completes, when it is determined that the data to be transmitted needs to be transmitted using a binding link, encapsulate the data to be transmitted according to the binding data format; and the transmission module may be further configured to transmit encapsulated data to be transmitted through a binding link in a updated binding group information table.

In an embodiment, the selection module may include a binding data packet condition setting sub-module and a binding data packet decision sub-module, wherein the binding data packet condition setting sub-module is configured to set a condition under which the data to be transmitted is required to be transmitted using a binding link in the binding group; and wherein the binding data packet decision sub-module is configured to determine whether the data is transmitted using the binding link according to the condition set by the binding data packet condition setting sub-module.

An embodiment of the disclosure further provides a computer storage medium, stored thereon computer-executable instructions, when executed, to implement the aforementioned data transmission method.

In the data transmission method, apparatus and a computer storage medium, when it is determined that a transmitting end device and a receiving end device both support a link binding capability, a binding group is established; when it is determined that data is selected to be transmitted by a binding link in the binding group, the data to be transmitted is encapsulated according to a binding data format and is transmitted through the binding link. In this way, the technical solutions according to embodiments of the disclosure can combine bandwidths of multi-medium links and provide appropriate bandwidth distribution for data streams of different traffic so that data streams of a certain traffic can be transmitted using a binding link and data streams of all traffic can be transmitted using a binding link, thereby improving QoS of a network. Furthermore, the technical solutions according to embodiments of the disclosure can enable bandwidths of multiple links to be combined together, implement binding of links of different media and thus provide better services for transmission of data streams having higher bandwidth requirements, thereby improving user experience. In addition, the technical solutions according to embodiments of the disclosure are especially suitable for link binding and data stream transmission under multi-medium environments in a home network.

DETAILED DESCRIPTION

In order to make clearer the technical problem to be solved, the technical solutions and the advantages of the disclosure, detailed description will be made below with reference to accompanying drawings and specific embodiments.

Figure 1:
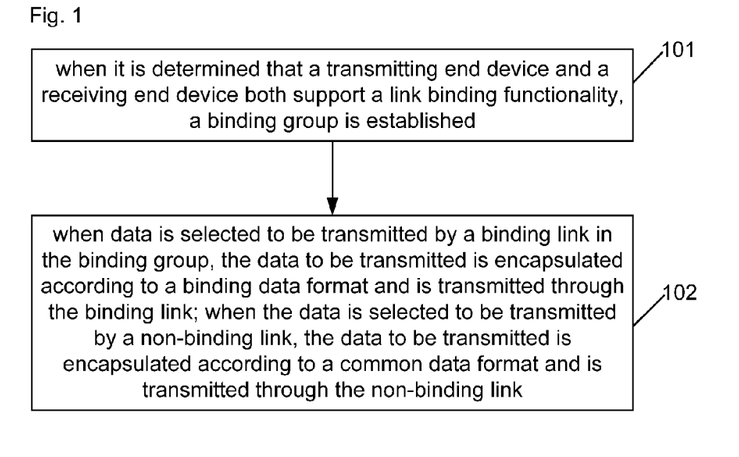
FIG. 1 is a schematic flow chart of a data transmission method according to an embodiment of the disclosure.

FIG. 1 is a schematic flow chart of a data transmission method according to an embodiment of the disclosure. As shown in FIG. 1, the method mainly includes steps as follows.

Step 101, when it is determined that a transmitting end device and a receiving end device both support a link binding capability, a binding group is established;

step 102, when data is selected to be transmitted by a binding link in the binding group, the data to be transmitted is encapsulated according to a binding data format and is transmitted through the binding link; when the data is selected to be transmitted by a non-binding link, the data to be transmitted is encapsulated according to a common data format and is transmitted through the non-binding link.

Herein, the binding link is located in the binding group information table, and the non-binding link is any single link.

Herein, the common data format is the same as the existing data format, and thus detailed description thereof will be omitted.

Specifically, the step that when it is determined that the data to be transmitted needs to be transmitted using a binding link, the data to be transmitted is encapsulated according to the binding data format and is transmitted through the binding link includes:

when the data to be transmitted meets a given condition for transmission of data using a binding link, the data to be transmitted is encapsulated according to the binding data format, and the data encapsulated according to the binding data format is transmitted using the binding link.

In an embodiment, the given condition for transmission of data using the binding link includes and is not limited to: a QoS level of the data, a VLAN number of a data packet being set to a given value or a priority identifier of a data packet being larger than a given threshold; the given condition includes one or more of aforementioned conditions.

For example, a VLAN number of data packets having a higher bandwidth demand, such as video streams, can be set to a given value. An abstraction layer functional entity of the transmitting end device checks a VLAN number and priority identifier output from an upper layer protocol stack. If the VLAN number or the priority identifier of the data packet meets one of the given conditions, the data packet is transmitted using a binding link. The abstraction layer functional entity encapsulates the data packet according to the binding data format. If neither the VLAN nor the priority identifier meets the given condition, the data packet is transmitted using the non-binding link, and the abstraction layer functional entity encapsulates the data packet according to the common data format. The above setting and determination of the condition for transmission of data using a binding link can be implemented on the abstraction layer functional entity and can also be implemented on the upper layer protocol stack.

Specifically, the binding data format includes a message serial number, a fragment number and a fragment identifier.

Figure 2:
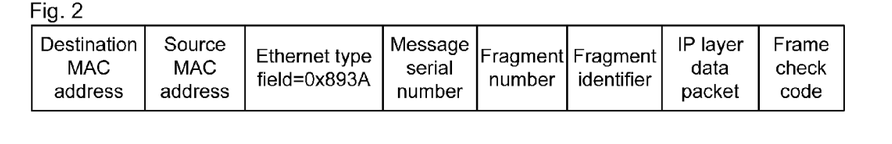
FIG. 2 is a schematic diagram of a binding data format according to an embodiment of the disclosure.

In an embodiment of the disclosure, main differences between the binding data format and the common data format lie in that the binding data format uses an Ethernet frame header and Ethernet type field of a message defined by IEEE 1905 standard, further includes fields such as a message serial number, a fragment number and a fragment identifier, and other information fields can be included among these three fields. FIG. 2 is a schematic diagram of a binding data format according to an embodiment of the disclosure, wherein the IP (Internet Protocol) data packet is a data packet output from an upper layer protocol stack. Upon reception of out-of-order data packet streams through a binding link, a receiving end sequences and reconstructs data packet streams according to the message serial number, the fragment identifier and the fragment number.

In an embodiment, the method further includes:

the transmitting end device and the receiving end device are in an initial state, a binding setup completion state, a binding update completion state, a binding transmission starting state or a binding transmission completion state, and switch between these states under a given condition.

In an embodiment, the method further includes:

the transmitting end device or the receiving end device transmits a binding capability closing message containing an identifier of a binding group required to be closed, and the transmitting end device and the receiving end device delete the binding group required to be closed.

Specifically, the step that it is determined that a transmitting end device and a receiving end device both support a link binding capability includes:

message interaction is performed between the transmitting end device and the receiving end device, wherein interactive messages therebetween carry information indicating whether the link binding capability is supported by each device.

In an embodiment, the interactive messages may be one of the following messages but not limited thereto: an added binding capability notification message and a binding capability notification response message, or a topology query message and a topology response message, or a link quality query message and a link quality response message, or a binding setup request message and a binding setup response message.

Specifically, the step that a binding group is established includes:

the transmitting end device transmits, to the receiving end device, a link binding setup request message that carries a binding group information table, wherein the binding group information table contains the binding link; and upon reception of the link binding setup request message transmitted by the transmitting end device, the receiving end device returns a link binding setup response message to the transmitting end device, wherein the link binding setup response message contains a link binding setup success identifier or a link binding setup failure identifier. If setup of binding succeeds, the receiving end device establishes a binding group information table according to the link binding setup request transmitted by the transmitting end device.

Herein, the link binding setup request contains at least one of:

a binding group identifier, a number of interconnected interface pairs within the binding group (i.e., a number of binding links included in the binding group), an MAC interface address of each interface pair or an MAC interface type of each interface pair.

Figure 3:
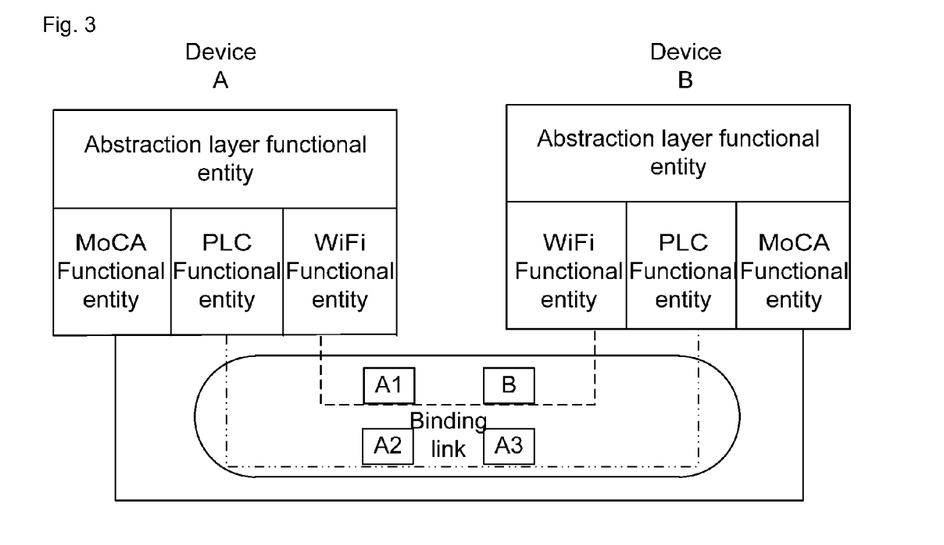
FIG. 3 is a schematic diagram of multi-medium link binding according to an embodiment of the disclosure.

For example, assuming that there are three links for communication, i.e., WiFi link, PLC link and MoCA (Multimedia over Coax Alliance) link, between the transmitting end device and the receiving end device, the transmitting end device can use WiFi link to transmit a link metric query message to the receiving end device, and the receiving end device uses the WiFi link to return a link metric query response message that can contain metric information of the WiFi link, the PLC link and the MoCA link. FIG. 3 is a schematic diagram of multi-medium link binding according to an embodiment of the disclosure. Each of a device A and a device B in FIG. 3 has three MAC interfaces, i.e., MoCA, PLC and WiFi, and each MAC interface corresponds to a link of a transmission medium. There is an abstraction layer functional entity above the MAC interfaces of each device that takes charge of scheduling various MAC interfaces during data transmission. For example, in the case where a bandwidth required by a traffic stream exceeds a bandwidth that can be provided by a single link or in other cases where there is high bandwidth demand, two or more links can be bound together so as to provide the traffic stream with better transmission service. FIG. 3 shows a situation where the WiFi link and the PLC link are bound to one logic link. For data to be transmitted, the abstraction layer functional entity determines, according to the given binding link transmission condition (for example QoS level of data), whether the data is transmitted through the binding link. For example, if data A has a higher QoS level, then the abstraction layer functional entity determines to encapsulate data A according to the binding data format (fragments of data A are sequenced as A1, A2, A3), and to transmit the encapsulated data A through a logic link bound from the WiFi link and the PLC link; data B has lower QoS level, and then the abstraction layer functional entity determines to transmit the data B through the WiFi link.

Specifically, the method further includes:

the transmitting end device transmits, to the receiving end device, a link binding group update request message that carries a binding group information table required to be updated;

upon reception of the binding group update request message transmitted by the transmitting end device, the receiving end device returns a response to the link binding group update request message to the transmitting end device, wherein the response to the binding group update request message contains a binding group update success identifier or a binding group update failure identifier. If update of the binding group succeeds, the receiving end device updates the binding group information table according to the binding group update request transmitted by the transmitting end device.

After update of the binding group information table completes, when it is determined that the data to be transmitted needs to be transmitted using a binding link, the data to be transmitted is encapsulated according to the binding data format and is transmitted through a binding link in a updated binding group information table.

Figure 4:
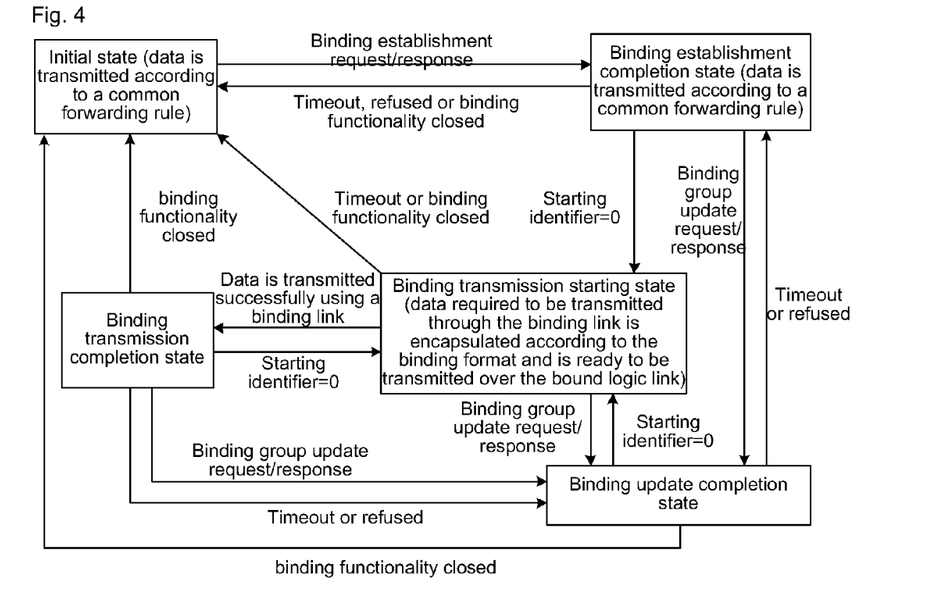
FIG. 4 is a state diagram for a binding capability according to an embodiment of the disclosure.

FIG. 4 is a state diagram for a multi-medium binding capability according to an embodiment of the disclosure. As shown in FIG. 4, the transmitting end device or the receiving end device has an initial state, a binding setup completion state, a binding update completion state, a binding transmission starting state or a binding transmission completion state, and switches between these states under a given condition. At the initial state, the data packet is transmitted according to a common forward rule in the prior art. At the initial state, the transmitting end device can transmit a link binding setup request message to the receiving end device, and the receiving end device returns a link binding setup response message to the transmitting end device. After the transmitting end device and the receiving end device both complete setup of a binding group information table, it indicates that each device enters the binding setup completion state. When a starting identifier is equal to 0, i.e., when the binding link is to be used to transmit the data encapsulated according to the binding data format, the process enters a binding transmission starting state from a binding setup completion state or a binding transmission completion state or a binding update completion state. If the starting identifier is larger than 0, each device remains at an original state. When the transmission of data using the binding link succeeds, each device enters the binding transmission completion state from the binding transmission starting state. At the binding setup completion state or the binding transmission completion state or the binding transmission starting state, if the transmitting end device transmits a binding group update request to the receiving end device, the receiving end device returns a binding group update response message to the transmitting end device, and after the transmitting end device and the receiving end device both complete update of the binding group information table, each device enters a binding update completion state. A binding capability closing operation can be implemented when the device is in the binding setup completion state, the binding transmission starting state, the binding update completion state or the binding transmission completion state, and after implementing the binding capability closing operation, the device switches to the initial state. At the binding transmission starting state, if the receiving end fails to receive data transmitted through the binding link within a given period of time, the receiving end device enters the initial state. In addition, if the transmitting end device receives a binding setup response message including the binding setup failure identifier or a binding update response message including the binding update failure identifier from the receiving end device, or if the transmitting end device fails to receive the binding setup response message or the binding update response message from the receiving end device within a specified period of time, the transmitting end state remains at the original state.

Figure 5:
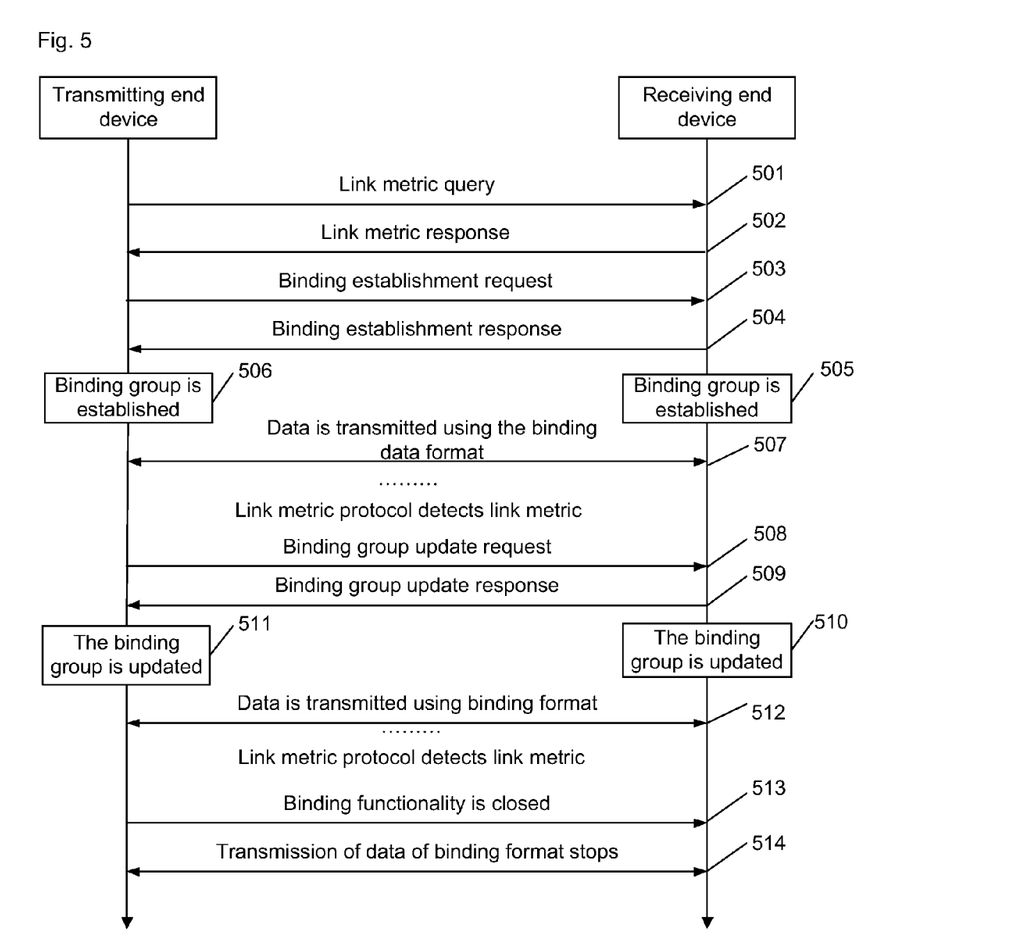
FIG. 5 is a schematic flow chart showing interaction based on a binding management protocol according to an embodiment of the disclosure.

FIG. 5 is a schematic flow chart showing interaction based on a binding management protocol according to an embodiment of the disclosure, which includes the following steps.

Step 501, a transmitting end device transmits, to a receiving end device, a link metric query message that can contain an identifier indicating that the transmitting end device supports a binding capability.

Herein, if the identifier indicating that the transmitting end device supports the binding capability is not contained in the link metric query message, said identifier can also be included in an added binding capability notification message, a topology query message, or a binding setup request message transmitted in step 503.

Step 502, upon reception of the link metric query message from the transmitting end device, the receiving end device returns a link metric response message that contains an identifier indicating that the receiving end device supports a binding capability.

Herein, if the identifier indicating that the receiving end device supports the binding capability is not contained in the link metric response message, said identifier can also be included in the added binding capability notification response message, a topology response message, or a binding setup response message transmitted in step 504.

Step 503, the transmitting end device transmits a binding setup request message to the receiving end device.

Specifically, the binding setup request message contains: a binding group identifier, a number of interconnected interface pairs within the binding group, i.e., a number of binding links included in the binding group, an MAC interface address of each interface pair or an MAC interface type of each interface pair.

For example, assuming that there are three links for communication, i.e., MoCA link, PLC link and WiFi link, between the transmitting end device and the receiving end device, the transmitting end desires to transmit data using a binding group consisting of the MoCA link and the WiFi link, and then in the above binding setup request message, the number of interconnected interface pairs in the binding group has a value of 2, the corresponding MAC interface type contains interface type identifiers for MoCA and WiFi, and MAC interface addresses of the interface pair include four MAC addresses for both the MoCA interface pair and the WiFi interface pair.

The above steps 501 to 503 can be appreciated as the initial state shown in FIG. 4.

Step 504, the receiving end device returns a binding setup response message to the transmitting end device.

Herein, upon reception of the binding setup request message from the transmitting end device, if accepting the binding group set by the transmitting end device, the receiving end device returns the binding setup response message. Herein, when the binding setup response message contains an identifier indicating successful setup of the binding, the transmitting device enters a binding setup completion state from the initial state. If the receiving end device refuses to enable the binding capability for some reason, the returned binding setup response message contains an identifier indicating failed setup of the binding and an identifier indicating the failure reason. In this case, the transmitting end device remains at the initial state. If the transmitting end device fails to receive the binding setup response message from the receiving end device, it remains at the initial state.

In the embodiment, it is assumed that the binding setup success identifier is included in the binding setup response message and the transmitting end device changes from the initial state to the binding setup completion state, i.e., proceeds to step 505.

Step 505, the receiving end device establishes, according to content in the binding setup request message transmitted by the transmitting end device, a binding group information table at the receiving end device, and the table is used during data transmission through the binding link.

Step 506, the transmitting end device receives the binding setup response message containing a binding setup success identifier, which is transmitted by the receiving end device, and establishes a binding group information table at the transmitting end device, and the table is used during data transmission using the binding link.

The above steps 505 and 506 can be appreciated as the binding setup completion state shown in FIG. 4.

Step 507, the data packet is transmitted using the binding data format.

Herein, the starting identifier can be set, for example, if the starting identifier is larger than 0, the device remains at binding setup completion state; if the starting identifier is equal to 0, the device changes from the binding setup completion state to a binding transmission starting state. The starting identifier can be countdown of a timer (for example countdown from 100 to 0), or be a condition threshold (for example, when there is a data stream requiring transmission through a binding link, the starting identifier is equal to 0; otherwise the starting identifier is equal to 1). At the binding transmission starting state, if the transmitting end device needs to transmit data using the binding link, the transmitting end device needs to encapsulate the data using the binding data format and then transmit the data. When the data is transmitted successfully, the device changes from the binding transmission starting state to the binding transmission completion state. At this time, if the starting identifier is still 0, the device returns to the binding transmission starting state, and prepares to transmit the next matching data using a binding link. If the starting identifier is larger than 0, the device remains at the binding transmission completion state. According to the IEEE 1905 protocol, when a device transmits data, a link metric query and response message will be transmitted at regular intervals so that the metric of the link can be detected in real time. At the binding transmission starting state, if the receiving end device fails to receive data transmitted through the binding link within a given period of time, the receiving end device enters the initial state.

When it is detected according to the link metric protocol that it is not appropriate to construct a binding group using the MoCA link and the WiFi link, for example, a ratio between the remaining bandwidth of the MoCA link and that of the WiFi link is too large such that quality of transmission through the binding link will be reduced, the binding group needs to be modified while it is more appropriate to form a binding group using the WiFi link and the PLC link, and then the setting of the binding group can be modified by transmission of a binding group update message, which may happen at the binding setup completion state, the binding transmission starting state or the binding transmission completion state.

Step 508, the transmitting end device transmits a binding group update request message to the receiving end device.

Specifically, the binding group update request message contains: a binding group identifier, a number of interconnected interface pairs within the binding group, i.e., a number of binding links included in the binding group, an MAC interface address of each interface pair or an MAC interface type of each interface pair.

Assuming that the transmitting end desires to transmit data using a binding group consisting of the WiFi link and the PLC link, then in the above binding group update request message, the number of interconnected interface pairs in the binding group has a value of 2, the corresponding MAC interface type contains interface type identifiers for PLC and WiFi, and MAC interface addresses of the interface pairs include four MAC addresses for both the PLC interface pair and the WiFi interface pair.

Step 509, the receiving end device transmits a binding group update response message to the transmitting end device.

Herein, upon reception of the binding group update request message from the transmitting end device, if the receiving end device accepts the setting of a new binding group made by the transmitting end device, the receiving end device returns the binding group update response message, wherein when the binding group update response message contains an identifier indicating successful update of the binding group, the device enters a binding group update completion state. If the receiving end device does not accept modification made to the binding group, the returned binding group update response message contains an identifier indicating failed update of the binding group and an identifier indicating the failure reason, and the receiving end device remains at the original state. If the transmitting end device does not receive the binding setup response message from the receiving end device, it remains at the original state.

In the above embodiment, when the returned binding group update response message contains the binding group update success identifier, the receiving end device or the transmitting device switches to the binding update completion state, i.e., proceeds to step 510.

Step 510, the receiving end device updates, according to content in the binding group update request message transmitted by the transmitting end device, a binding group information table at the receiving end device, and the binding group information table is used during subsequent data transmission using the binding data format.

Step 511, the transmitting end device receives the binding group update response message containing the binding group update success identifier transmitted by the receiving end device, and updates the binding group information table at the device, and the table is used during subsequent data transmission using the binding data format.

The above steps 510 and 511 can be appreciated as the binding update completion state shown in FIG. 4.

Step 512, data is transmitted using the updated binding link.

Herein, if the starting identifier is larger than 0, the device remains at the binding update completion state; if the starting identifier is equal to 0, the device changes from the binding update completion state to the binding transmission starting state. For example, if the specified countdown timer reaches 0 or a certain starting condition is met, the starting identifier is equal to 0. When the transmitting end device needs to transmit data using the binding link, it encapsulates the data using the binding data format and then transmits the encapsulated data. In addition, the link metric protocol is transmitted between the transmitting end device and the receiving end device at regular intervals so that quality of the link can be detected.

Step 513, at the binding setup completion state, the binding transmission starting state, the binding transmission completion state or the binding update completion state, if the transmitting end device needs to exit the binding capability, it can transmit, to the receiving end device, a binding capability closing message and enter the initial state.

Step 514, the transmitting end device and the receiving end device stops transmitting data using the binding data format, and data transmitted between the transmitting end device and the receiving end device is transmitted all using the common data format.

Herein, the above step 514 can be appreciated as the initial state shown in FIG. 4.

Figure 6:
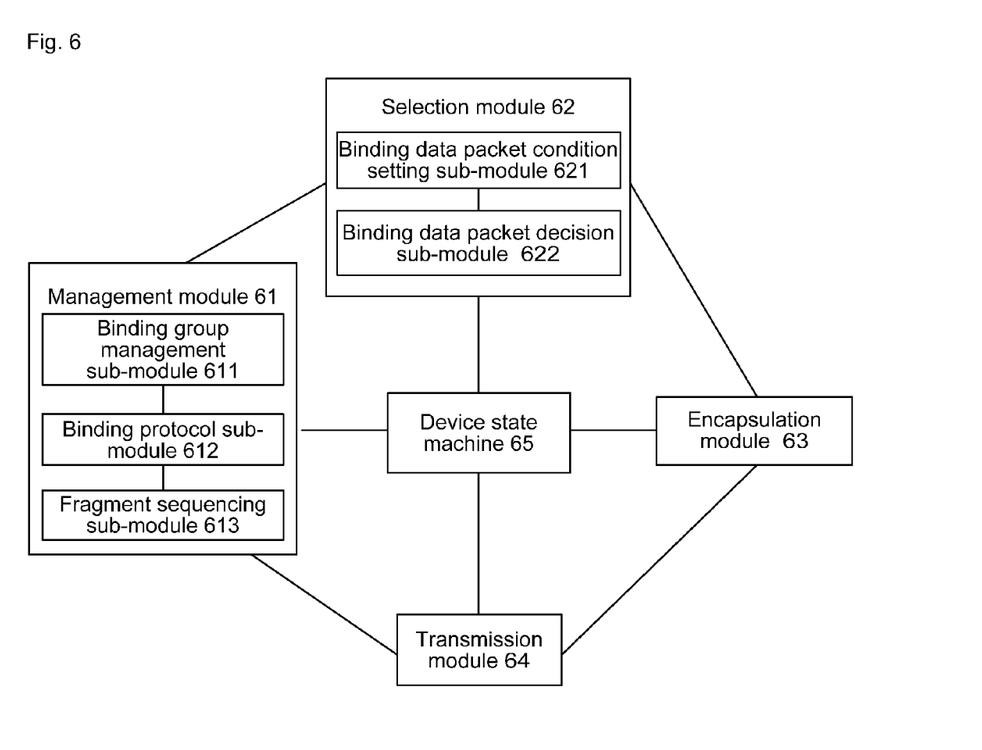
FIG. 6 is a schematic structural diagram of a data transmission apparatus according to an embodiment of the disclosure.

FIG. 6 is a schematic structural diagram of a data transmission apparatus according to an embodiment of the disclosure. As shown in FIG. 6, the apparatus includes a management module 61, a selection module 62, an encapsulation module 63 and a transmission module 64.

The management module 61 is configured to establish a binding group when it is determined that a transmitting end device and a receiving end device both support a link binding capability.

The selection module 62 is configured to determine whether data is selected to be transmitted by a binding link or a non-binding link.

The encapsulation module 63 is configured to, when the selection module 62 selects the data to be transmitted by a binding link, encapsulate the data to be transmitted according to a binding data format, and when the selection module 62 selects the data to be transmitted by a non-binding link, encapsulate the data to be transmitted according to a common data format and transmit the encapsulated data to be transmitted through the non-binding link.

The transmission module 64 is configured to transmit, through the binding link, the data to be transmitted that is encapsulated by the encapsulation module.

Preferably, the apparatus further includes:

a device state machine 65 configured to record the transmitting end device and the receiving end device in an initial state, a binding setup completion state, a binding update completion state, a binding transmission starting state or a binding transmission completion state, and enable the transmitting end device or the receiving end device to switch between these states under a given condition.

Specifically, the device state machine 65 is configured to describe states at which the transmitting end device and the receiving end device are during the process of the method and how they switch between these states, wherein the states include an initial state, a binding setup completion state, a binding update completion state, a binding transmission starting state and a binding transmission completion state. The transmitting end device or the receiving end device is at one of these states at a certain instance, and switches between these states under a given condition.

Herein, the binding update completion state is an optional state, and switching between various states is as shown in FIG. 4.

Specifically, the management module 61 is further configured to:

upon reception of the link binding setup response message containing a binding setup success identifier, which is transmitted by the receiving end device, establish a binding group information table at the transmitting end device; and upon reception of the link binding setup request message transmitted by the transmitting end device, establish the binding group information table at the receiving end device according to the link binding setup request message transmitted by the transmitting end device, and return a link binding setup response message to the transmitting end device, wherein the link binding setup response message contains a link binding setup success identifier or a link binding setup failure identifier.

Specifically, the management module 61 includes a binding group management sub-module 611, a binding protocol sub-module 612 and a fragment sequencing sub-module 613.

The binding group management sub-module 611 is configured to determine whether a binding group is established.

The binding protocol sub-module 612 is configured to construct a binding setup request message, a binding setup response message and a binding capability closing message, wherein the binding setup request message contains a binding group information table, and the binding setup response message contains a link binding setup success identifier or a link binding setup failure identifier.

The fragment sequencing sub-module 613 is configured to determine whether fragmentation is required for a data packet, and if yes, perform fragmentation on the data packet and sequence resulting fragments.

Specifically, the management module 61 is further configured to:

upon reception of the link binding group update response message containing a binding group update success identifier, which is transmitted by the receiving end device, update the binding link in the binding group information table at the transmitting end device; and upon reception of the binding group update request message transmitted by the transmitting end device, update the binding group information table at the receiving end device according to the link binding group update request message transmitted by the transmitting end device, and return a link binding group update response message to the transmitting end device, wherein the link binding group update response message contains a binding group update success identifier or a binding group update failure identifier.

Accordingly, the binding group management sub-module 611 is further configured to determine whether the binding group is required to be updated; and the binding protocol sub-module 612 is configured to construct a binding group update request message and a binding group update response message, wherein the binding group update request message contains an information table of a binding group required to be updated, and the binding group update response message contains a binding group update success identifier or a binding group update failure identifier.

Preferably, the encapsulation module 63 is further configured to:

after update of the binding group completes, when it is determined that the data to be transmitted needs to be transmitted using a binding link, the data to be transmitted is encapsulated according to the binding data format and is transmitted through a binding link in a updated binding group information table.

Specifically, the selection module 62 includes a binding data packet condition setting sub-module 621 and a binding data packet decision sub-module 622.

The binding data packet condition setting sub-module 621 is configured to set a condition under which the data to be transmitted is required to be transmitted using a binding link in the binding group.

The binding data packet decision sub-module 622 is configured to determine whether data is transmitted using the binding link according to the condition set by the binding data packet condition setting sub-module.

Specifically, the transmission module 63 includes an interface scheduling sub-module and multiple interface units such as a first interface unit, a second interface unit and the like.

The interface scheduling sub-module is configured to determine an interface unit through which the device transmits data.

In practical applications, the data transmission apparatus can be applicable to the field of communications; the management module 61, the selection module 62, the encapsulation module 63, the transmission module 64 and the device state machine 65 can all be implemented by a server in a communication network, or a Central Processing Unit (CPU), a Digital Signal Processor (DSP) or a Field-Programmable Gate Array (FPGA) in a communication device.

The above data transmission device will be elaborated below in a specific application environment.

Figure 7:
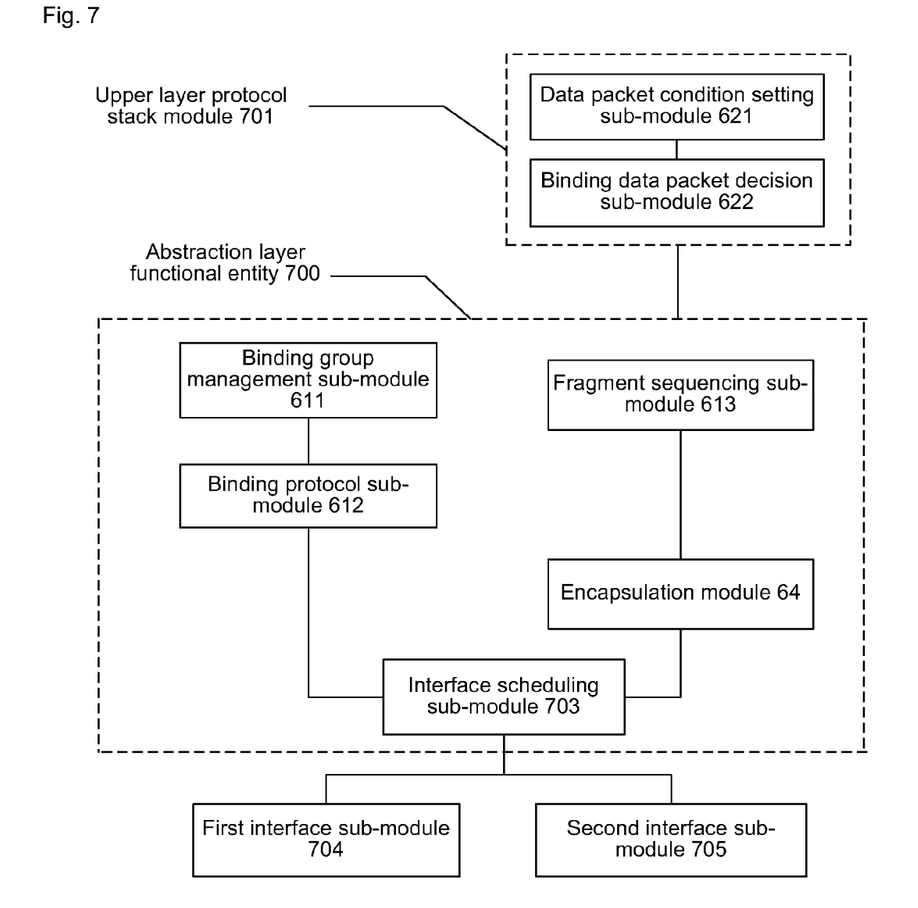
FIG. 7 is a schematic structural diagram of a data transmission apparatus having a link binding capability according to an embodiment of the disclosure.

FIG. 7 is a schematic structural diagram of a data transmission apparatus having a link binding capability according to an embodiment of the disclosure. The apparatus in the embodiment supports interfaces of two media, and is described by taking formation of one binding group using links corresponding to the two media as an example. In FIG. 7, a first interface sub-module 704 and a second interface sub-module 705 can be any two of a WiFi functional entity, a PLC functional entity, an MoCA functional entity and an Ethernet functional entity, but are not limited to these four media.

As shown in FIG. 7, the data transmission apparatus having a link binding capability includes an upper protocol stack module 701, an abstraction layer functional entity 700, a binding group management sub-module 611, a binding protocol sub-module 612, a fragment sequencing sub-module 613, a binding data packet condition setting sub-module 621, a binding data packet decision sub-module 622, an encapsulation module 63, an interface scheduling sub-module 703, a first interface sub-module 704 and a second interface sub-module 705.

The upper protocol stack module 701 is configured to perform TCP/IP layer encapsulation processing on data required to be transmitted, and then transmit data packets subjected to TCP/IP layer encapsulation to the abstraction layer functional entity 700 for sequencing and encapsulation processing.

The abstraction layer functional entity 700 is configured to implement management related to the binding capability and implement the data transmission/reception capability.

The binding data packet condition setting sub-module 621 is configured to set a condition under which the data to be transmitted is required to be transmitted using a binding link in the binding group.

The binding data packet decision sub-module 622 is configured to determine whether data received from the upper layer protocol stack module 701 is transmitted using the binding link according to the condition set by the binding data packet condition setting sub-module 621.

Herein, the binding data packet condition setting module 621 and the binding data packet decision module 622 can be arranged in the upper layer protocol stack module 701 or the abstraction layer functional entity 700.

The binding group management sub-module 621 is configured to determine whether a binding group is established and whether the binding group is required to be updated, and update quality of links corresponding to the first interface sub-module 704 and the second interface sub-module 705 according to the regular link metric protocol.

The binding protocol sub-module 612 is configured to construct the binding setup request message/binding setup response message, the binding group update request message/binding group update response message and the binding capability closing message.

The fragment sequencing sub-module 613 is configured to determine whether the length of a data packet subjected to the TCP/IP layer processing exceeds a specific value, if yes, perform fragmentation to divide the data packet into several fragments, add each fragment with a fragment identifier, add fragment numbers according to the order in which the fragmentation is processed, and finally add a serial number to the data packet; if the length does not exceed the specific value, not perform the fragmentation and only add the serial number to the data packet.

The encapsulation module 63 is configured to encapsulate the data packet added with the serial number according to the 1905 message format, add a 1905 Ethernet frame header and output the data packet of the binding format.

The interface scheduling sub-module 703 is configured to select the first interface sub-module 704 or the second interface sub-module 705 to transmit the data packet. The transmitted data packet can be a binding protocol message constructed by the binding protocol sub-module 612, and can also be the data packet of the binding format output by the data packet encapsulation sub-module 623.

The first interface sub-module 704 and the second interface sub-module 705 are configured to convert the data packet to be transmitted to a physical signal, which can be borne by the network transmission medium, for transmission.

Herein, the binding group management sub-module 611, the binding protocol sub-module 612 and the fragment sequencing sub-module 613 constitute the management module 61 in FIG. 6. The binding data packet condition setting sub-module 621 and the binding data packet decision sub-module 622 constitute the selection module 62 in FIG. 6. The interface scheduling sub-module 703, the first interface sub-module 704 and the second interface sub-module 705 constitute the transmission module 63 in FIG. 6.

An embodiment of the disclosure further discloses a computer storage medium, in which computer-executable instructions are stored, wherein the computer-executable instructions are configured to implement the data transmission method shown in FIG. 1 of the embodiment of the disclosure.

The foregoing is merely preferable embodiments of the disclosure, and is not intended to limit the disclosure.

INDUSTRIAL APPLICABILITY

In embodiments of the disclosure, when it is determined that a transmitting end device and a receiving end device both support a link binding capability, a binding group is established; when a binding link in the binding group is selected to transmit data to be transmitted, the data to be transmitted is encapsulated according to a binding data format and is transmitted through the binding link; when a non-binding link is selected to transmit the data to be transmitted, the data to be transmitted is encapsulated according to a common data format and is transmitted through the non-binding link. In this way, the technical solutions according to embodiments of the disclosure can provide appropriate bandwidth distribution to data streams of different traffic and improve QoS of the whole home network.

The invention claimed is:

1. A data transmission method, comprising:
    establishing a binding group when it is determined that a transmitting end device and a receiving end device both support a link binding capability;
    when data is selected to be transmitted by a binding link in the binding group according to a given condition, encapsulating the data to be transmitted according to a binding data format and transmitting the encapsulated data through the binding link; when the data is selected to be transmitted by a non-binding link, encapsulating the data to be transmitted according to a common data format and transmitting the encapsulated data through the non-binding link;
    wherein the binding data format further comprises three fields: a message serial number, a fragment number and a fragment identifier; and
    the given condition for transmission of data using the binding link comprises at least one of: a VLAN number of a data packet being set to a given value and a priority identifier of a data packet being larger than a given threshold.

2. The method according to claim 1, wherein a state of the transmitting end device or the receiving end device comprises: an initial state, a binding setup completion state, a binding update completion state, a binding transmission starting state or a binding transmission completion state,
    wherein the transmitting end device or the receiving end device can switch between these states under a given condition.

3. The method according to claim 1, wherein operation of determining that the transmitting end device and the receiving end device both support the link binding capability comprises:
    performing message interaction between the transmitting end device and the receiving end device, wherein interactive messages carry information indicating whether the link binding capability is supported by each device.

4. The method according to claim 3, wherein the interactive messages comprise an added binding capability notification message and a binding capability notification response message, or a topology query message and a topology response message, or a link quality query message and a link quality response message, or a binding setup request message and a binding setup response message.

5. The method according to claim 1, wherein the operation of establishing a binding group comprises:
    transmitting, by the transmitting end device, to the receiving end device, a link binding setup request message that carries a binding group information table, wherein the binding group information table contains the binding links; and
    upon reception of the link binding setup request message transmitted by the transmitting end device, returning, by the receiving end device, a link binding setup response message to the transmitting end device, wherein the link binding setup response message contains a link binding setup success identifier or a link binding setup failure identifier.

6. The method according to claim 5, wherein the binding group information table comprises at least one of:
    a binding group identifier, a number of interconnected interface pairs within the binding group, a Media Access Control (MAC) interface address of each interface pair or an MAC interface type of each interface pair.

7. The method according to claim 1, further comprising:
    transmitting, by the transmitting end device, to the receiving end device, a binding group update request message that carries a binding group information table required to be updated;
    upon reception of the binding group update request message transmitted by the transmitting end device, returning, by the receiving end device, a binding group update response message to the transmitting end device, wherein the binding group update response message contains a binding group update success identifier or a binding group update failure identifier.

8. The method according to claim 7, further comprising:
    after update of the binding group completes, when it is determined that the data to be transmitted needs to be transmitted using a binding link, encapsulating the data to be transmitted according to the binding data format and transmitting encapsulated data to be transmitted through a binding link in a updated binding group information table.

9. The method according to claim 1, wherein operation of selecting the data to be transmitted by a binding link in the binding group comprises:
    when the data to be transmitted meets a given condition for transmission of data using the binding link, indicating that the data is selected to be transmitted by the binding link in the binding group.

10. The method according to claim 9, wherein the given condition for transmission of data using the binding link comprises a given Quality of Service (QoS) level of data, a Virtual Local Area Network (VLAN) number of a data packet being set to a given value or a priority identifier of a data packet being larger than a given threshold.

11. The method according to claim 1, wherein the binding data format comprises a message serial number, a fragment number and a fragment identifier.

12. The method according to claim 1, further comprising:
transmitting, by the transmitting end device or the receiving end device, a binding capability closing message containing an identifier of a binding group required to be closed, and deleting, by the transmitting end device and the receiving end device, the binding group required to be closed.

13. A data transmission apparatus, comprising: a memory storing programming instructions; and
a processor configured to be capable of executing the stored programming instructions to:
establish a binding group when it is determined that a transmitting end device and a receiving end device both support a link binding capability;
determine whether data is selected to be transmitted by a binding link or a non-binding link according to a given condition;
when the data is selected to be transmitted by a binding link in the binding group, encapsulate the data to be transmitted according to a binding data format and transmit the encapsulated data through the binding link;
when the data is selected to be transmitted by a non-binding link, encapsulate the data to be transmitted according to a common data format and transmit the encapsulated data through the non-binding link; and
transmit, through the binding link, the data to be transmitted that is encapsulated;
wherein the binding data format further comprises three fields: a message serial number, a fragment number and a fragment identifier; and
the given condition for transmission of data using the binding link comprises at least one of: a VLAN number of a data packet being set to a given value and a priority identifier of a data packet being larger than a given threshold.

14. The apparatus according to claim 13, further comprising:
a device state machine configured to record the transmitting end device and the receiving end device in an initial state, a binding setup completion state, a binding update completion state, a binding transmission starting state or a binding transmission completion state, and enable the transmitting end device or the receiving end device to switch between these states under a given condition.

15. The apparatus according to claim 13, wherein the processor is further configured to be capable of executing the stored programming instructions to:
determine whether a binding group is established;
construct a binding setup request message, a binding setup response message and a binding capability closing message, wherein the binding setup request message contains a binding group information table, and the binding setup response message contains a link binding setup success identifier or a link binding setup failure identifier; and
configured to determine whether fragmentation is required for a data packet, and if yes, perform fragmentation on the data packet and sequence resulting fragments.

16. The apparatus according to claim 15, the processor is further configured to be capable of executing the stored programming instructions to
determine whether the binding group is required to be updated;
construct a binding group update request message and a binding group update response message, wherein the binding group update request message contains an information table of a binding group required to be updated, and the binding group update response message contains a binding group update success identifier or a binding group update failure identifier.

17. The apparatus according to claim 13, wherein the processor is further configured to be capable of executing the stored programming instructions to, after update of the binding group completes, when it is determined that the data to be transmitted needs to be transmitted using a binding link, encapsulate the data to be transmitted according to the binding data format; and
transmit encapsulated data to be transmitted through a binding link in a updated binding group information table.

18. The apparatus according to claim 13, the processor is further configured to be capable of executing the stored programming instructions to
set a condition under which the data to be transmitted is required to be transmitted using a binding link in the binding group; and
determine whether the data is transmitted using the binding link according to the condition.

19. A non-transitory computer storage medium stored thereon computer-executable instructions, when executed, to implement the method according to claim 1.

* * * * *